United States Patent
Kiyota et al.

(10) Patent No.: US 7,827,003 B2
(45) Date of Patent: Nov. 2, 2010

(54) STRAIGHTNESS MEASURING METHOD AND STRAIGHTNESS MEASURING APPARATUS

(75) Inventors: Yoshihisa Kiyota, Yokosuka (JP); Kouichi Ichihara, Kurashiki (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/607,540

(22) Filed: Oct. 28, 2009

(65) Prior Publication Data

US 2010/0106455 A1    Apr. 29, 2010

(30) Foreign Application Priority Data

Oct. 29, 2008   (JP) .............................. 2008-277596

(51) Int. Cl.
G06F 15/00 (2006.01)
G01B 5/20 (2006.01)
(52) U.S. Cl. ...................................... 702/167
(58) Field of Classification Search ................. 702/167, 702/150
See application file for complete search history.

(56) References Cited

U.S. PATENT DOCUMENTS 7,318,285 B2 * 1/2008 Matsumiya et al. ........... 33/561

FOREIGN PATENT DOCUMENTS

JP         2003-254747       9/2003

* cited by examiner

*Primary Examiner*—Bryan Bui
(74) *Attorney, Agent, or Firm*—Squire, Sanders & Dempsey L.L.P.

(57) ABSTRACT

Distances from three displacement meters arranged in a first direction to three measuring points arranged along a measurement line that extends in the first direction on a surface of an object to be measured are measured while a movable body, which is either the three displacement meter or an object to be measured, is moved in the first direction relative to a stationary body, which is the other one. Solution candidates are determined which are defined by two profiles among a surface profile along the measurement line, a profile of locus curve which is the locus a reference point fixed to the movable body, and a profile of a pitching component accompanied with the movement of the movable body. One candidate solution with the highest fitness is extracted by applying a genetic algorithm using a fitness function defined on the basis of the other profile.

4 Claims, 8 Drawing Sheets

STRAIGHTNESS MEASURING METHOD AND STRAIGHTNESS MEASURING APPARATUS

BACKGROUND OF THE INVENTION

1. Field of the Invention

The present invention relates to a straightness measuring method using a three-point method and a straightness measuring apparatus.

Priority is claimed on Japanese Patent Application No. 2008-277596, filed on Oct. 29, 2008, the entire contents of which are incorporated herein by reference.

2. Description of Related Art

The straightness of a surface of an object to be measured can be measured using a three-point method (JP-A-2003-254747). The surface profile can be determined by describing measurement data of three displacement meters using a profile of a locus curve which is the moving locus of reference points of three displacement meters, a surface profile of the object to be measured, and a profile of a pitching component of three displacement meters and solving the described expressions as simultaneous equations.

The computing operation of calculating the above-mentioned simultaneous equations is complicated and the preparation of the program requires significant labor.

SUMMARY OF THE INVENTION

An advantage of some aspects of the invention is that it provides a straightness measuring method capable of easily calculating a surface profile of an object to be measured.

Another advantage of some aspects of the invention is that it provides a straightness measuring apparatus measuring straightness using the above-mentioned method.

According to an aspect of the invention, there is provided a straightness measuring method including:

measuring distances from three displacement meters, which are arranged in a first direction and fixed in relative positions therebetween, to three measuring points arranged along a measurement line that extends in the first direction on a surface of an object to be measured while the three displacement meters are opposed to the object to be measured while moving a movable body relative to a stationary body in the first direction, the moving body being either the three displacement meters or the object to be measured and the stationary body being the other one;

determining candidate solutions defined by two profiles among a surface profile along the measurement line, a profile of a locus curve which is the locus of a reference point fixed to the movable body, and a profile of a pitching component accompanied with the movement of the movable body; and extracting a candidate solution with the highest fitness from the candidate solutions by applying a genetic algorithm to the candidate solutions using a fitness function defined on the basis of the other profile, among the surface profile, the profile of the locus curve, and the profile of the pitching component, which does not define the candidate solutions.

According to another aspect of the invention, there is provided a straightness measuring apparatus including:

a table supporting an object to be measured;

a sensor head including three displacement meters which are arranged in a first direction, the three displacement meters each measuring distances to measuring points arranged in the first direction on the surface of the object to be measured;

a guide mechanism supporting a movable body which is either the sensor head or the table, in such a manner that the movable body is able to move in the first direction relative to a stationary body which is the other one out of the sensor head and the table; and a controller calculating a profile of the surface along a measurement line parallel to the first direction on the basis of the measurement data measured by the three displacement meters, wherein the controller performs:

acquiring measurement data by measuring the distances to the measuring points on the surface along the measurement line using the three displacement meters while moving the movable body along a locus curve which is the locus of a reference point fixed to the movable body;

defining candidate solutions using two profiles among a surface profile along the measurement line, a profile of the locus curve, and a profile of a pitching component of the movable body; and extracting a candidate solution with the highest fitness from the candidate solutions by applying a genetic algorithm to the candidate solutions using a fitness function defined on the basis of the other profile, among the surface profile along the measurement line, the profile of the locus curve, and the profile of the pitching component of the movable body, which does not define the candidate solutions.

Since the genetic algorithm is used, it is possible to acquire the surface profile without carrying out complex calculations such as simultaneous equations.

BRIEF DESCRIPTION OF THE DRAWINGS

FIG. 1A is a perspective view schematically illustrating a straightness measuring apparatus according to an embodiment of the invention and FIG. 16 is a diagram schematically illustrating a sensor head part.

DETAILED DESCRIPTION OF THE INVENTION

Figure 1A:
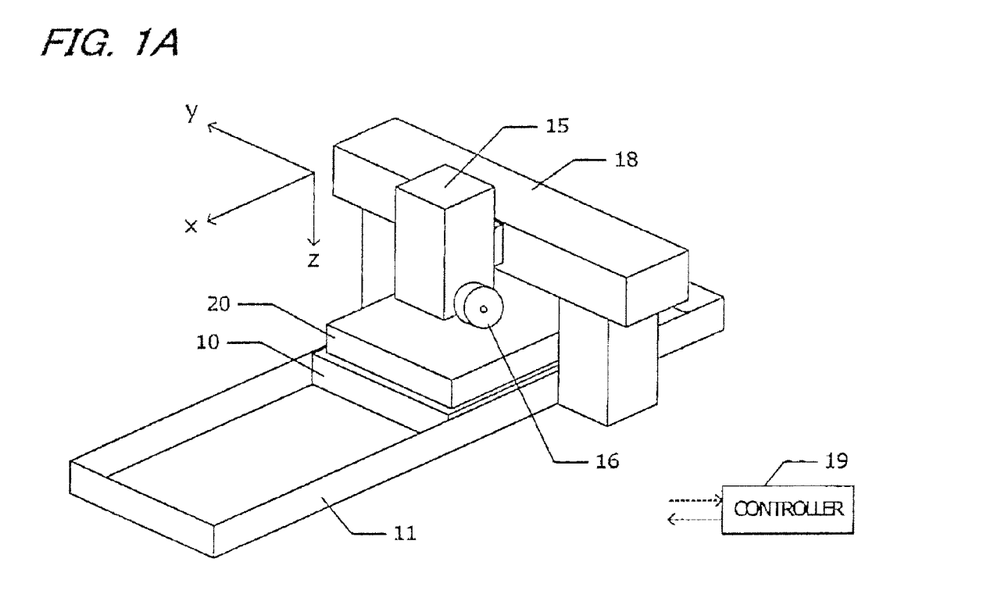

FIG. 1A is a perspective view schematically illustrating a straightness measuring apparatus according to an embodiment of the invention. A movable table 10 is supported by a table guiding mechanism 11 so as to be movable in one direction. The xyz orthogonal coordinate system is defined in which the moving direction of the movable table 10 is defined as the x axis direction and the vertically downward direction is defined as the z axis direction.

A guide rail 18 supports a grinding head 15 above the movable table 10. The grinding head 15 is movable in the y axis direction along the guide rail 18. The grinding head 15 is also movable in the z direction relative to the guide rail 18. That is, the grinding head 15 can go up and down relative to the movable table 10. A grinding stone 16 is mounted on the lower end of the grinding head 15. The grinding stone 16 has a columnar shape and is mounted on the grinding head 15 in such an attitude that the center axis of the grinding stone 16 becomes parallel to the y axis.

An object 20 to be measured (object to be ground) is held on the movable table 10. The surface of the object 20 to be measured can be ground by moving the movable table 10 in the x direction while rotating the grinding stone 16 in the state where the grinding stone 16 is brought into contact with the surface of the object 20 to be measured.

The controller 19 controls the movement of the movable table 10 and the grinding head 15.

Figure 1B:
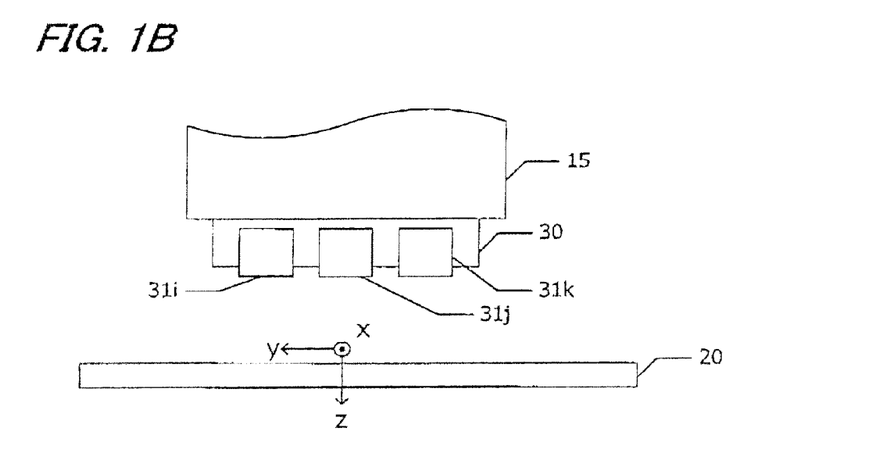

As illustrated in FIG. 1B, a sensor head 30 is mounted on the lower end of the grinding head 15. Three displacement meters 31i, 31j, and 31k are mounted on the sensor head 30. For example, a laser displacement meter may be used for the displacement meters 31i, 31j, and 31k. The displacement meters 31i, 31j, and 31k can measure distances from the displacement meters to measuring points on the surface of the object 20 to be measured. The three displacement meters 31i, 31j, and 31k are arranged in the y direction. The measuring points of the three displacement meters 31i, 31j, and 31k are also arranged in the y direction. Accordingly, the height of the surface along a measurement line that is parallel to the y direction can be measured. By taking measurements while moving the grinding head 15 in the y direction, the surface profile along the measurement line on the surface of the object 20 to be measured can be measured. Measurement data are input to the controller 19 from the displacement meters 31i, 31j, and 31k.

Figure 2:
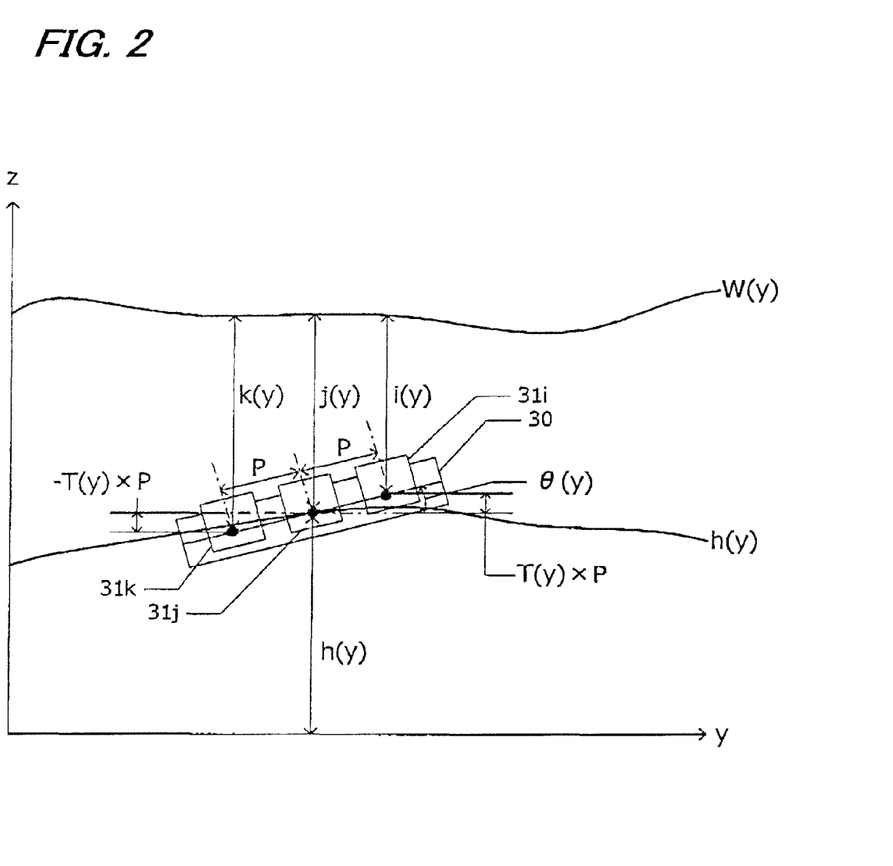
FIG. 2 is a diagram illustrating the definition of a surface profile W(y) of an object to be measured, measurement data i(y), j(y), and k(y) of displacement meters, a locus curve h(y), and a pitching component T(y).

A coordinate system and various functions will be described now with reference to FIG. 2. In FIG. 2, the upward direction is the positive direction of the z axis. Accordingly, the positional relation in the vertical direction of the sensor head 30 and the object 20 to be measured is reverse to that illustrated in FIG. 1B. The displacement meters 31i, 31j, and 31k are arranged in series toward the negative direction of the y axis. The zero point adjustments of the three displacement meters 31i, 31j, and 31k are completed and the zero points of the three displacement meters are arranged in a straight line. The gap between the zero point of the displacement meter 31i and the zero point of the displacement meter 31j and the gap between the zero point of the displacement meter 1j and the zero point of the displacement meter 31k are both represented by P.

The profile of the surface of the object 20 to be measured along the measurement line is expressed by W(y). The locus of a reference point (locus curve) when the sensor head 30 is moved in the y direction is expressed by h(y). The reference point corresponds to, for example, the zero point of the central displacement meter 31j. Ideally, the locus curve h(y) is a straight line, but the actual locus curve is deformed away from the ideal straight line.

The inclination angle of the straight line connecting the zero points of the three displacement meters 31i, 31j, and 31k with respect to the y axis is expressed by θ(y). The ideal inclination angle θ(y) is zero, but the actual inclination angle θ(y) varies independently of the slope of the locus curve h(y), because pitching occurs with the movement of the sensor head 30. The height difference between the zero point of the displacement meter 31i and the reference point and the height difference between the zero point of the displacement meter 31k and the reference point can be expressed by T(y)×P. Here, the pitching component is approximated to T(y)=sin(θ(y)). When the measured values of the displacement meters 31i, 31j, and 31k are i(y), j(y), and k(y), respectively, the following expression is established.

$$W(y+P)=h(y)+i(y)+T(y)\times P \quad (1)$$

$$W(y)=h(y)+j(y) \quad (2)$$

$$W(y-P)=h(y)+k(y)-T(y)\times P \quad (3)$$

Since the inclination angle θ(y) is sufficiently small, cos(θ(y)) is approximate to 1.

The shape of the object 20 to be measured is, for example, a square with side lengths of 2 m and the gap P between the displacement meters is, for example, 100 mm.

Figure 3:
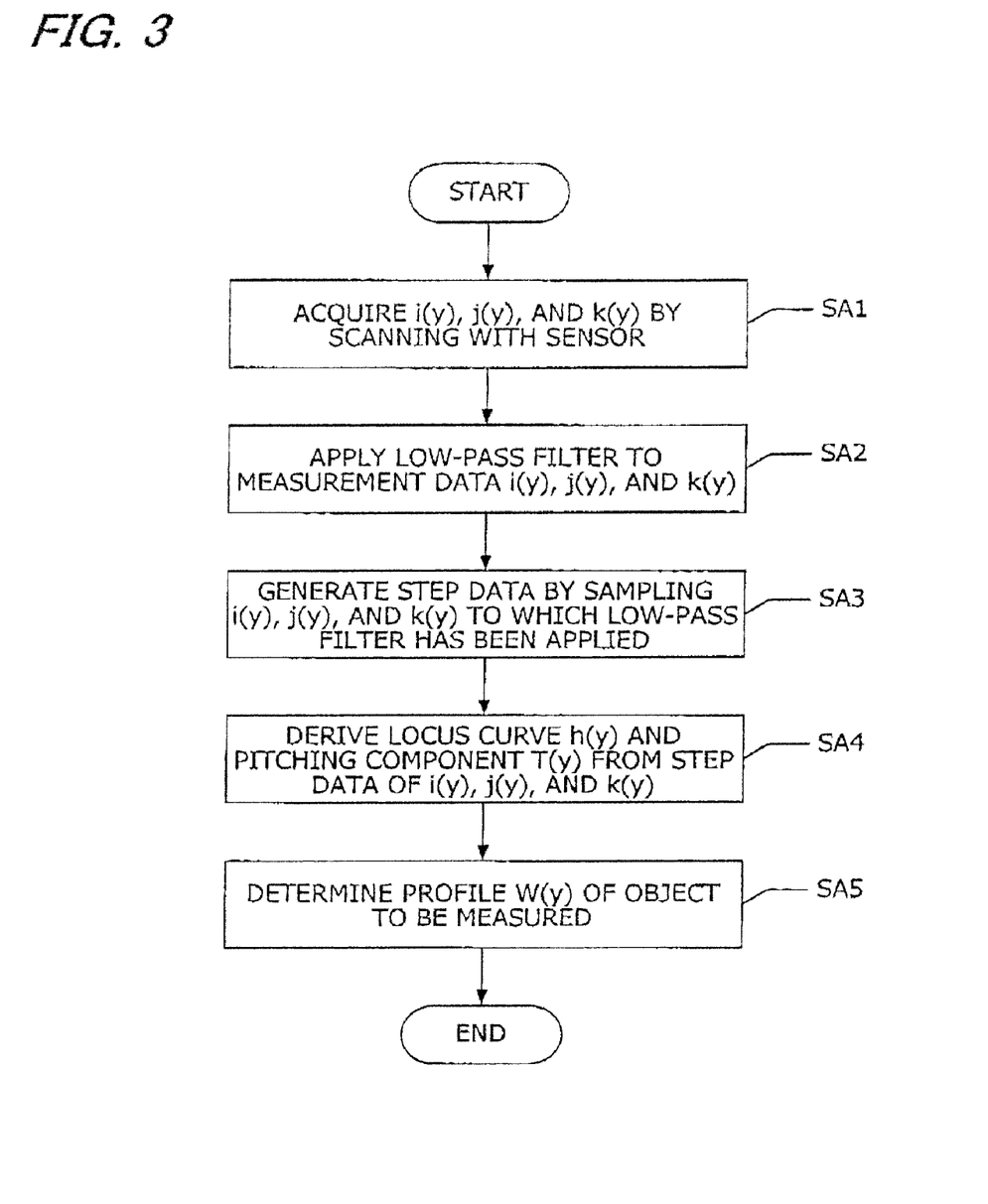
FIG. 3 is a flowchart illustrating a straightness measuring method according to another embodiment of the invention.

FIG. 3 is a flowchart illustrating a straightness measuring method according to an embodiment of the invention. First, the distances i(y), j(y), and k(y) to the measuring points on the surface of the object 20 to be measured are measured with the displacement meters 31i, 31j, and 31k while moving the grinding head 15 and the sensor head 30 in the y direction. The measurement data are input to the controller 19.

In step SA2, the noise component is removed by applying a low-pass filter to the measurement data i(y), j(y), and k(y). To make the low-pass filter effective, the measurement data i(y), j(y), and k(y) are acquired at intervals sufficiently smaller than the gap P of the displacement meters. For example, the measurement data i(y), j(y), and k(y) are acquired at intervals of 0.05 mm.

In step SA3, step data is generated by sampling the measurement data i(y), j(y), and k(y) to which the low-pass filter has been applied. The sampling period is, for example, half the gap P of the displacement meters, that is, 50 mm.

In step SA4, the locus curve h(y) and the pitching component T(y) are derived on the basis of the step data i(y), j(y), and k(y) using a genetic algorithm.

Figure 4:
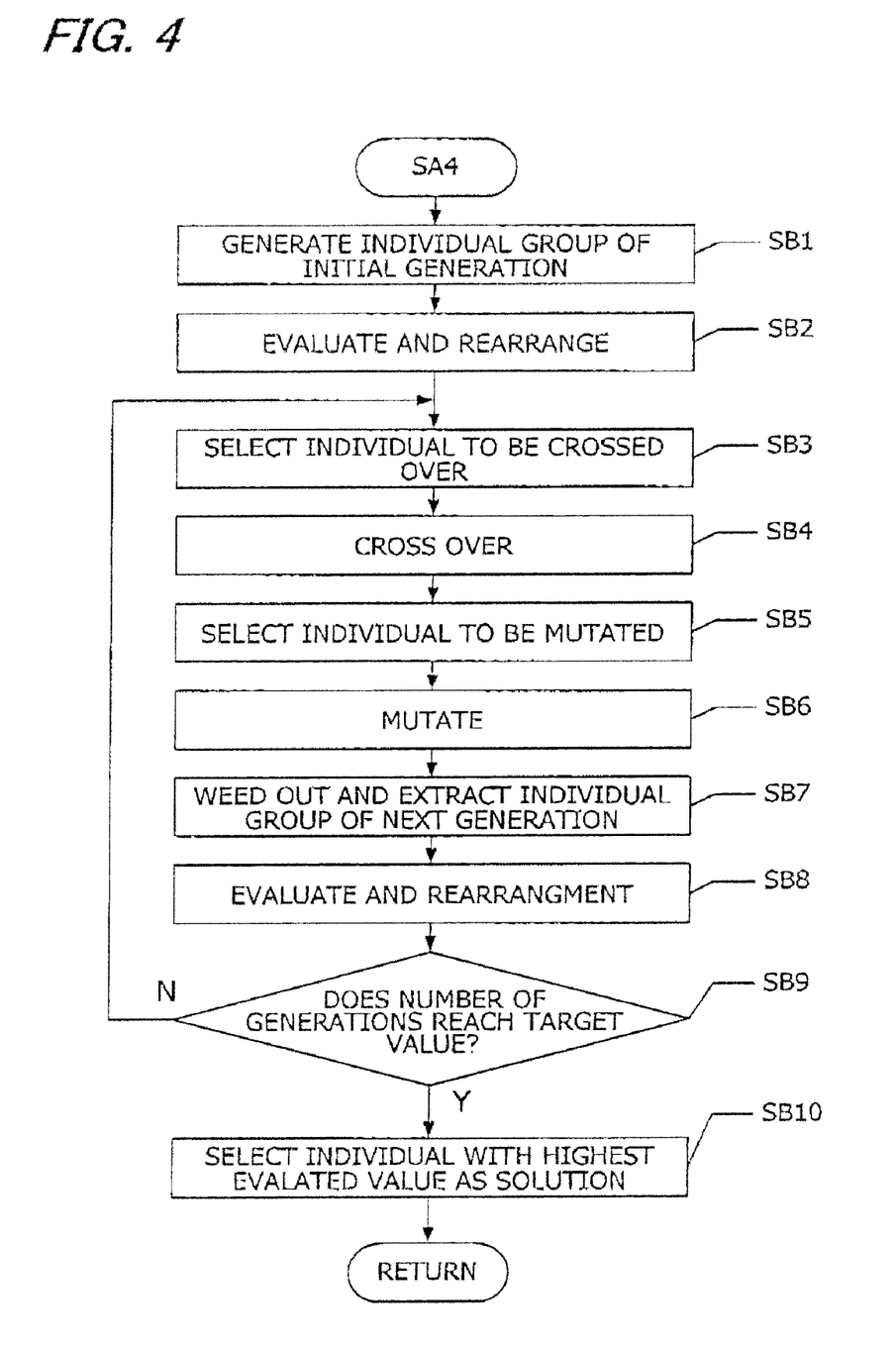
FIG. 4 is a flowchart illustrating genetic algorithm employed by the straightness measuring method according to the embodiment.

FIG. 4 is a flowchart specifically illustrating the process of step SA4 employing the genetic algorithm. In the genetic algorithm, a set of the locus curve h(y) and the pitching component T(y) is treated as one individual solution.

In step SB1, individual solutions of the initial generation are generated. For example, the number of individual solutions is 200. For example, the locus curve h(y) and the pitching component T(y) of one individual solution are set to 0. The locus curve h(y) and the pitching component T(y) of other 199 individual solutions are determined by random numbers. In the initial state, the locus curve h(y) and the pitching component T(y) of all the individual solutions may be set to 0.

In step SB2, the individual solutions are evaluated using a fitness function and the fitness of each of the individual solutions is calculated. The fitness function is set on the basis of the surface profile W(y). Since three displacement meters 31i, 31j, and 31k measure the profile along the same measurement line on the surface of the same object 20 to be measured, three surface profiles $W_1(y)$, $W_2(y)$, and $W_3(y)$ calculated using Expressions 1 to 3 should be equal to each other.

Here, the difference $W_1(y)-W_2(y)$ between $W_1(y)$ and $W_2(y)$ and the difference $W_2(y)-W_3(y)$ between $W_2(y)$ and $W_3(y)$ are first calculated. The zero-order component in a polynomial expression of the surface profile W(y), corresponds to the gap between the object 20 to be measured and the sensor head 30 and the first-order component corresponds to the attitude of the object 20 to be measured. That is, the zero-order component and the first-order component of the surface profile W(y) do not relate directly to the surface profile of the object 20 to be measured. Accordingly, the zero-order component and the first-order component are removed from the difference $W_1(y)-W_2(y)$ and the difference $W_2(y)-W_3(y)$.

The variance is calculated for both the difference $W_1(y)-W_2(y)$ and the difference $W_2(y)-W_3(y)$ from which the zero-order component and the first-order component are removed. The sum of two variances is used as the fitness function. A smaller fitness function value means higher fitness. All the individual solutions are re-arranged based on the fitness.

In step SB3, the individual solutions to be crossed over are selected. For example, selection probability is set in such a manner that individual solutions having higher fitness have a higher probability of being selected. 10 pairs formed of two individual solutions are selected on the basis of the selection probability.

In step SB4, at least one of the locus curve h(y) and the pitching component T(y) of each of the selected pairs of individual solutions is crossed over to generate a new individual solution.

Figure 5:
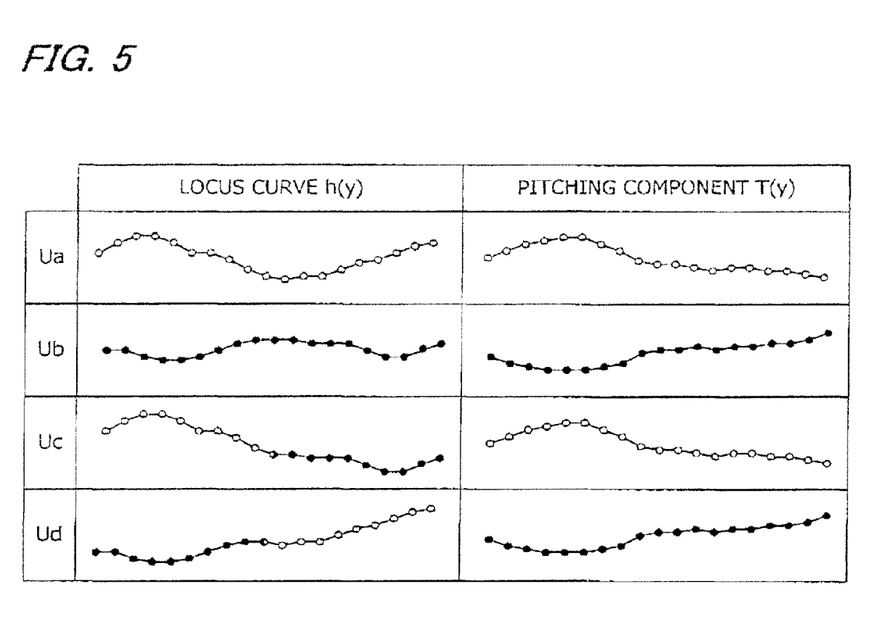
FIG. 5 is a diagram illustrating a crossover carried out in a genetic algorithm.

The crossover method will be described with reference to FIG. 5. The locus curves h(y) and the pitching component profiles T(y) of two individual solutions Ua and Ub selected to be crossed over are shown among the individual solutions of the present generation. A part of the locus curve h(y) of the individual solution Ua and the corresponding part of the locus curve h(y) of the individual solution Ub are exchanged (crossed aver) to generate new (child) individual solutions Uc and Ud. The pitching component profiles T(y) of the new individual solutions Uc and Ud respectively inherit from the pitching component profile T(y) of the parent individual solutions Ua and Ub. In this way, two individual solutions are newly generated from two individual solutions. Since 10 pairs of individual solutions are selected in step SB3, new 10 pairs, that is, 20 individual solutions, are generated in step SB4.

The pitching component profiles T(y) may be crossed over or both the locus curves h(y) and the pitching component profiles T(y) may be crossed over.

When the process of step SB4 has ended, individual solutions to be mutated are selected in step SB5. For example, 10 Individual solutions with high fitness are set aside, and 80 individual solutions are selected from the other 1 individual solutions.

In step SB6, the selected individual solutions are mutated to generate new (child) individual solutions.

Figure 6:
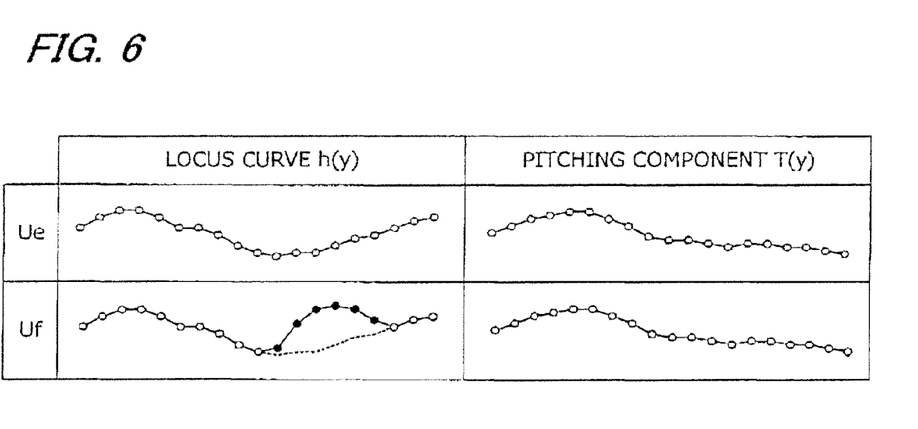
FIG. 6 is a diagram illustrating a mutation carried out in the genetic algorithm.

The mutation method will be described with reference to FIG. 6. In FIG. 6, one individual solution Ue selected in step SB5 is shown. The Gaussian curve with a random width and height is superposed on the locus curve h(y) of the individual solution Ue to generate a new individual solution Uf. The Gaussian curve may be superposed on the pitching component profile T(y) of the individual solution Ue or the Gaussian curve may be superposed on both the locus curve h(y) and the pitching component profile T(y). Since 80 individual solutions are selected in step SB5, 80 individual solutions are newly generated in step SB6.

In step SB7, the individual solutions with low fitness are weeded out. Specifically, 100 individual solutions with low fitness among 200 individual solutions of the present generation are replaced with the newly generated 100 individual solutions. Accordingly, 200 new generation individual solutions are determined.

In step SB8, the 200 new generation individual solutions are evaluated to calculate their fitness. Since the fitness of the 100 individual solutions from the previous generation that were not weeded out in step SB7 are already calculated, the fitness thereof need not be calculated again. 200 individual solutions of the new generation are re-arranged based on their fitness.

In step SB9, it is determined whether the number of generations reaches a target value. When the number of generations does not reach the target value, the process returns to step SB3. When the number of generations has reached the target value, the locus curve h(y) and the pitching component profile T(y) of the individual solution with the highest fitness among all the individual solutions of the newest generation are adopted as the optimal solution in step SB10.

Figure 7:
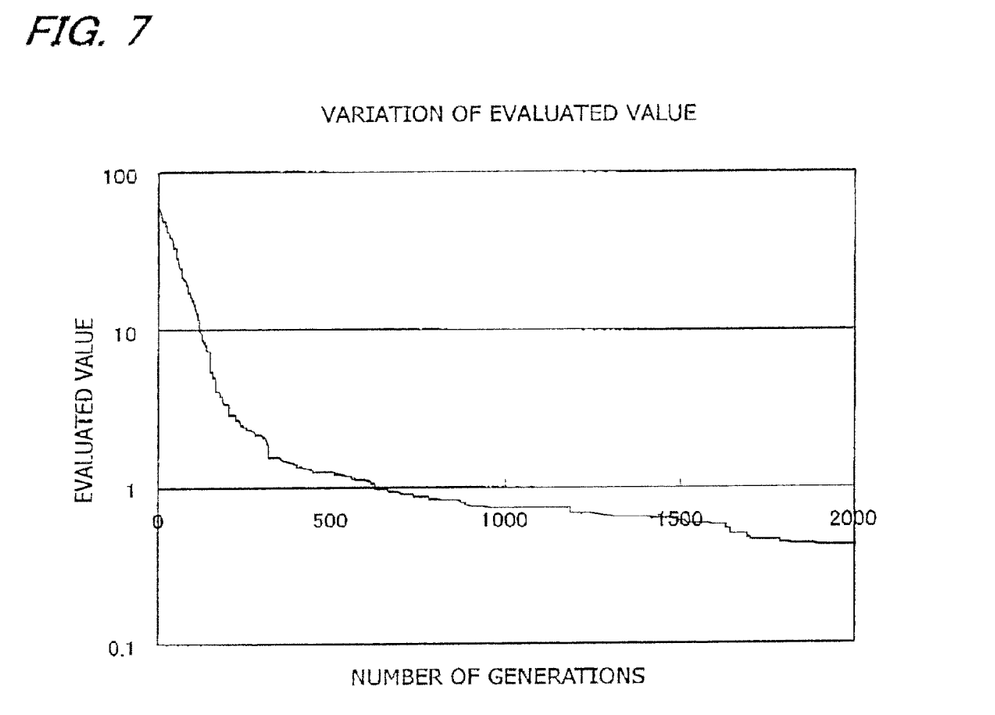
FIG. 7 is a graph representing that an evaluation value decreases (the fitness increases) as the number of generations increases by using the genetic algorithm.

The variation of the evaluated value is shown in FIG. 7. The horizontal axis represents the generation number and the vertical axis represents the value of the fitness function (evaluated value) of the individual solution with the highest fitness among all the individual solutions of the present generation. As the generations progress, it can be seen that the evaluated value decreases (the fitness increases). In the 2000-th generation, the value of the fitness function has decreased to about 0.4 $\mu m^2$. The standard deviation is 0.63 $\mu m$, which provides the satisfactory precision. Since the evaluated value in the 500-th generation converges to about 90% and then the finding of the optimal solution is performed slowly, it is thought that the setting of the parameters of the genetic algorithm is appropriate.

Figure 8A:
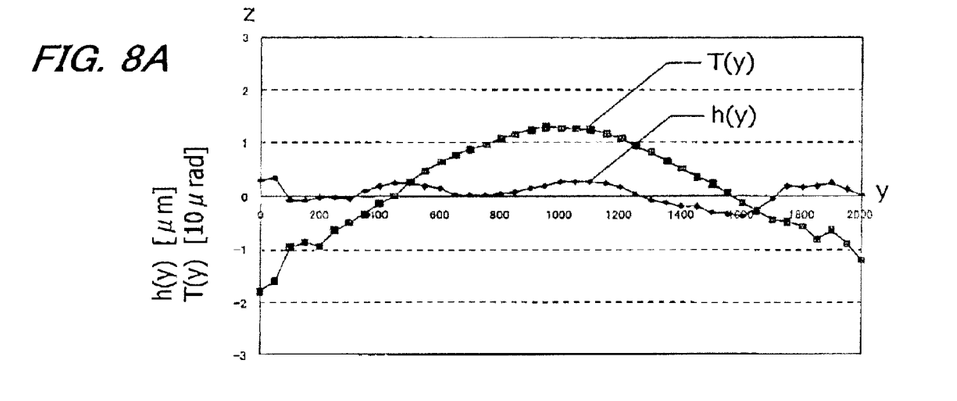
FIG. 8A is a graph illustrating the optimal solutions of the locus curve h(y) and the pitching component T(y) calculated by the genetic algorithm.

FIG. 8A illustrates the locus curve h(y) and the pitching component profile T(y) of the individual solution with the highest fitness. The vertical axis represents the values of h(y) and T(y), where the unit of h(y) is "$\mu m$" and the unit of T(y) is "10 $\mu rad$". The horizontal axis represents the position in the y direction in the unit of "mm". Since the zero-order component and the first-order component of the locus curve h(y) and the pitching component profile T(y) have no relation to the surface profile, FIG. 5A is shown with the zero-order component and the first-order component removed.

Figure 8B:
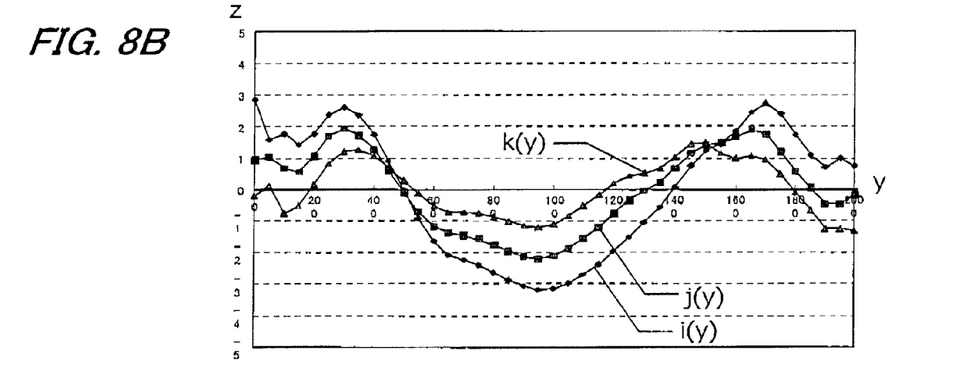
FIG. 8B is a graph illustrating measurement data of three displacement meters.

FIG. 8B illustrates the measurement data i(y), j(y), and k(y) measured by the displacement meters $31i$, $31j$, and $31k$. The horizontal axis represents the position in the y direction in the unit of "mm" and the vertical axis represents the values of the measurement data in the unit of "$\mu m$". The zero-order component and the first-order component are removed.

Figure 8C:
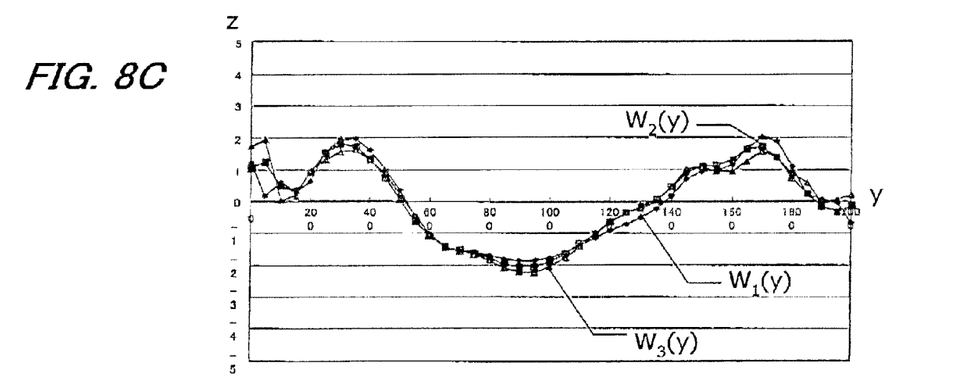
FIG. 8C is a graph illustrating the surface profile employing the optimal solution calculated by the genetic algorithm.

FIG. 8C shows the surface profiles $W_1(y)$, $W_2(y)$, and $W_3(y)$ obtained by assigning the optimal solutions of the locus curve h(y) and the pitching component profile T(y) into Expressions 1 to 3. It can be seen that the differences among the three surface profiles calculated using the optimal solutions are smaller than the differences among the three measurement data shown in FIG. 5B.

In the method according to this embodiment, it is possible to calculate the optimal solutions of the locus curve h(y), the pitching component profile T(y), and the surface profile W(y) without having to directly solve simultaneous equations including three unknown functions.

It is assumed in the above-mentioned embodiment that the zero points of the three displacement meters $31i$, $31j$, and $31k$ are adjusted so that the zero points are located in a straight line. The case where the zero points are not adjusted will be described now. When the distance from the straight line connecting the zero points of the displacement meters $31i$ and $31k$ at both ends to the zero point of the central displacement meter $31j$ is $\delta$, Expression 2 can be re-described as follows.

$$W(y)=h(y)+j(y)+\delta \qquad (4)$$

By eliminating T(y) and h(y) from Expressions 1, 3, and 4, the following expression is obtained.

$$W(y+P)-2W(y)+W(y-P)+2\delta=i(y)-2j(y)+k(y) \qquad (5)$$

Here, it is assumed that the surface profile W(y) is expressed by the following cubic expression 6.

$$W(y)=ay^3+by^2+cy+d \qquad (6)$$

By substituting Expression 6 into Expression 5, Expression 7 is obtained.

$$6aP^2y+2bP^2+2\delta=i(y)-2j(y)+k(y) \qquad (7)$$

All of the terms in the right side of Expression 7 are measurement data and the gap P of the displacement meters is known. Therefore, unknown a in the left side can be calculated from the first-order component of variable y in the right side. Even when the zero-order component of y in the right side can be found, δ in the left side is unknown and thus unknown b cannot be determined. That is, the third-order component a of the surface profile W(y) can be determined but the second-order component b cannot be determined. The fourth-order or higher-order components of the surface profile W(y) can be determined in the same way as the third-order component.

The second-order component of the locus curve h(y) is a lower-order component for determining the rough shape of the locus curve and is thought to be high reproducibility. That is, it is thought that no great variation exist in each of the measurements. Therefore, by measuring the second-order component of the locus curve h(y) in advance and assigning the second-order component into Expression 4, the second-order component of the surface profile W(y) can be determined.

It is thought that the third-order or higher-order components of the locus curve h(y) varies in every measurement. In the embodiment, the third-order or higher-order components of the surface profile W(y) are determined on the basis of the actual measurement data i(y), j(y), and k(y). Accordingly, even when the third-order or higher-order components of the locus curve h(y) varies from one measurement to another, it is possible to calculate the surface profile W(y) with high precision without any influence from the variations.

An example of the method of measuring the second-order component of the locus curve h(y) will be described now. First, the object 20 to be measured of which the surface profile W(y) is known is placed on the movable table 10. If the surface profile W(y) is not known, the surface profile W(y) of the object 20 to be measured placed on the movable table 10 is measured without any influence from the locus curve h(y). For example, by moving a tilt meter along the measurement line on the surface of the object 20 to be measured, the surface profile W(y) can be measured.

The surface of the object 20 to be measured of which the surface profile W(y) is known is measured with the central displacement meter 31*j*. Since the surface profile W(y) and the measurement data j(y) in Expression 5 are known, the second-order component of the locus curve h(y) can be determined.

In the above-mentioned embodiment, the surface profile of the object 20 to be measured can be calculated without making complex calculations such as solving simultaneous equations including three unknowns.

In the above-mentioned embodiment, the candidate solutions of the genetic algorithm are defined using the locus curve h(y) and the pitching component profile T(y), and the fitness function is defined on the basis of the surface profile W(y). Alternatively, the candidate solutions may be defined using two profiles among the locus curve h(y), the pitching component profile T(y), and the surface profile W(y), and the fitness function may be defined using the other profile.

In the above-mentioned embodiment, the displacement meters 31*i*, 31*j*, and 31*k* are moved relative to the object 20 to be measured, but the object 20 to be measured may be moved relative to the displacement meters 31*i*, 31*j*, and 31*k*. For example, in FIG. 1A, by arranging the displacement meters 31*i*, 31*j*, and 31*k* in the x direction and performing a measurement while moving the object 20 to be measured in the x direction, it is possible to measure the surface profile along the measurement line parallel to the x direction on the surface of the object 20 to be measured. By rotating the sensor head 30 illustrated in FIG. 1B by 90° about the rotation axis parallel to the z axis, the displacement meters 31*i*, 31*j*, and 31*k* can be arranged in the x direction. The sensor head 30 may be provided with such a rotating mechanism.

By overlapping the surface profiles along the plural measurement lines parallel to the x direction with the surface profiles along the plural measurement lines parallel to the y direction, it is possible to obtain two-dimensional surface profile information on the surface of the object 20 to be measured.

Although the invention has been described with reference to the embodiment, the invention is not limited to the embodiments. For example, it is obvious to those skilled in the art that various modifications, improvements, and combinations may be made to the invention.

What is claimed is:

1. A straightness measuring method comprising:
    measuring distances from three displacement meters, which are arranged in a first direction and fixed in relative positions therebetween, to three measuring points arranged along a measurement line that extends in the first direction on a surface of an object to be measured while the three displacement meters are opposed to the object to be measured while moving a movable body relative to a stationary body in the first direction, the moving body being either the three displacement meters or the object to be measured and the stationary body being the other one;
    determining candidate solutions defined by two profiles among a surface profile along the measurement line, a profile of a locus curve which is the locus of a reference point fixed to the movable body, and a profile of a pitching component accompanied with the movement of the movable body; and
    extracting one candidate solution with highest fitness from the candidate solutions by applying a genetic algorithm to the candidate solutions using a fitness function defined on the basis of the other profile, among the surface profile, the profile of the locus curve, and the profile of the pitching component, which does not define the candidate solutions.

2. The straightness measuring method according to claim 1, wherein the candidate solutions are determined using the profile of the locus curve and the profile of the pitching component, and the fitness function is defined using the surface profile.

3. The straightness measuring method according to claim 1, wherein first, second, and third surface profiles are calculated from the measurement results of the three displacement meters, respectively,
    wherein a first difference between the first surface profile and the second surface profile is calculated, a zero-order component and a first-order component are removed from the first difference, and a first variance of the first difference is then calculated,
    wherein a second difference between the second surface profile and the third surface profile is calculated, a zero-order component and a first-order component are removed from the second difference, and a second variance of the second difference is then calculated, and wherein the fitness function is defined on the basis of the first variance and the second variance.

4. A straightness measuring apparatus comprising:

a table supporting an object to be measured;

a sensor head including three displacement meters which are arranged in a first direction, the three displacement meters each measuring distances to measuring points arranged in the first direction on the surface of the object to be measured;

a guide mechanism supporting a movable body which is either the sensor head or the table, in such a manner that the movable body is able to move in the first direction relative to a stationary body which is the other one out of the sensor head and the table; and a controller calculating a profile of the surface along a measurement line parallel to the first direction on the basis of measurement data measured by the three displacement meters, wherein the controller performs:

acquiring measurement data by measuring the distances to the measuring points on the surface along the measurement line using the three displacement meters while moving the movable body along a locus curve which is the locus of a reference point fixed to the movable body;

defining candidate solutions using two profiles among a surface profile along the measurement line, a profile of the locus curve, and a profile of a pitching component of the movable body; and extracting one candidate solution with highest fitness from the candidate solutions by applying a genetic algorithm to the candidate solutions using a fitness function defined on the basis of the other profile, among the surface profile along the measurement line, the profile of the locus curve, and the profile of the pitching component of the movable body, which does not define the candidate solutions.

* * * * *